(12) United States Patent
Hada

(10) Patent No.: US 9,373,285 B2
(45) Date of Patent: Jun. 21, 2016

(54) DISPLAY DEVICE FOR VEHICLE

(71) Applicant: NIPPON SEIKI CO., LTD., Niigata (JP)

(72) Inventor: Makoto Hada, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 10 days.

(21) Appl. No.: 14/381,469

(22) PCT Filed: Feb. 6, 2013

(86) PCT No.: PCT/JP2013/052647
§ 371 (c)(1),
(2) Date: Aug. 27, 2014

(87) PCT Pub. No.: WO2013/129040
PCT Pub. Date: Sep. 6, 2013

(65) Prior Publication Data
US 2015/0130853 A1    May 14, 2015

(30) Foreign Application Priority Data

Feb. 28, 2012 (JP) ................................. 2012-041483

(51) Int. Cl.
*G09G 3/34* (2006.01)
*H04N 9/31* (2006.01)
(Continued)

(52) U.S. Cl.
CPC ............. *G09G 3/3413* (2013.01); *G02B 27/01* (2013.01); *G09G 3/346* (2013.01); *H04N 9/3111* (2013.01);
(Continued)

(58) Field of Classification Search
CPC ..... G09G 3/3413; G09G 3/346; G02B 27/01; G02B 26/0833; H04N 9/3111; H04N 9/3155; B60R 2300/20
See application file for complete search history.

(56) References Cited

U.S. PATENT DOCUMENTS 6,392,620 B1 *  5/2002  Mizutani ............. G09G 3/3406
345/88
7,133,022 B2 *  11/2006  Grabert ............. G02B 26/0833
345/156

(Continued)

FOREIGN PATENT DOCUMENTS

| JP | 05-193400 A | 8/1993 |
| JP | 2000-200063 A | 7/2000 |
| JP | 2007-122018 A | 5/2007 |
| JP | 2009-109711 A | 5/2009 |
| JP | 2011-075637 A | 4/2011 |

(Continued)

OTHER PUBLICATIONS

Extended European Search Report issued in European Patent Application No. 13 755 905.0 dated Jul. 10, 2015.
International Search Report issued in International Application No. PCT/JP2013/052647 dated Mar. 26, 2013.

*Primary Examiner* — Kumar Patel
*Assistant Examiner* — Sejoon Ahn
(74) *Attorney, Agent, or Firm* — McDermott Will & Emery LLP

(57) ABSTRACT

Provided is a display device for a vehicle such that the life of display elements can be made long even when used in a high temperature environment and, further, unpleasant sensations due to changes in brightness of display images can be prevented. A control unit (90) provides a display period (Fa) in which an illumination control unit (91) turns on light sources (11), and a display control unit (92) generates a display image (M) in display elements (30) within a frame (F) that constitutes the display image (M) on the basis of a display image signal and a non-display period (Fb) in which the illumination control unit (91) turns off all light sources (11). When the display control unit (92) changes the display period proportions (A) for mirrors (E) for the display elements (30) according to prescribed conditions, drive currents (I) and drive periods (H) for the light sources (11) are changed simultaneously such that brightness is not changed.

2 Claims, 13 Drawing Sheets

(51) Int. Cl.
G02B 27/01 (2006.01)
G02B 26/08 (2006.01)
G09G 3/00 (2006.01)

(52) U.S. Cl.
CPC ........... *H04N 9/3144* (2013.01); *H04N 9/3155* (2013.01); *B60R 2300/20* (2013.01); *G02B 26/0833* (2013.01); *G02B 2027/014* (2013.01); *G02B 2027/0112* (2013.01); *G02B 2027/0118* (2013.01); *G09G 3/002* (2013.01); *G09G 2310/0235* (2013.01); *G09G 2310/063* (2013.01); *G09G 2320/0646* (2013.01); *G09G 2330/045* (2013.01)

(56) References Cited

U.S. PATENT DOCUMENTS

| | | |
|---|---|---|
| 2007/0070024 A1 | 3/2007 | Araki et al. |
| 2010/0188443 A1 | 7/2010 | Lewis et al. |
| 2011/0309925 A1* | 12/2011 | Ishibashi ................ B60K 35/00 340/438 |

FOREIGN PATENT DOCUMENTS

| | | |
|---|---|---|
| JP | 2011-242619 A | 12/2011 |
| WO | 2011/086798 A1 | 7/2011 |

* cited by examiner (a)

(b)

(c)

DISPLAY DEVICE FOR VEHICLE

RELATED APPLICATIONS

This application is the U.S. National Phase under 35 U.S.C. §371 of International Application No. PCT/JP2013/052647, filed on Feb. 6, 2013, which in turn claims the benefit of Japanese Application No. 2012-041483, filed on Feb. 28, 2012, the disclosures of which Applications are incorporated by reference herein.

TECHNICAL FIELD

The present invention relates to a display device for vehicle, which displays an image by spatial modulation of light from a light source by a spatial light modulation element.

BACKGROUND ART

Various types of display device for vehicle have been proposed. Such a conventional display device for vehicle displays a virtual image by projecting a display image to a windshield of a vehicle or a semitransmissive plate called a combiner. An example of such a display is disclosed in Patent Literature 1. A display device for vehicle 1 is installed in a dashboard of a vehicle. A display light L projected by the display device for vehicle 1 is reflected by a windshield 2, and a vehicle driver 3 can visually recognize a virtual image V superimposed on a landscape (see FIG. 1).

One of such a display device for vehicle is provided with a spatial light modulation element using a field sequential drive system. When a digital micro-mirror device (DMD) or a reflection type display device is used as a spatial light modulation element in a high temperature environment like in a vehicle, if a DMD is driven in a normal temperature environment, there occurs a problem that a mirror of DMD is fixed to a constant state of either ON or OFF, an irreversible bright spot defect occurs, and the life of DMD is reduced. To solve such a problem, the applicant has proposed a display device for vehicle, in which a frame for forming a display image is provided with a display period for displaying an image by driving a light source and DMD, and a non-display period in which a light source is turned on and a DMD is appropriately driven. A DMD is driven during a non-display period, so that an ON drive period and an OFF drive period of each mirror of DMD within a frame becomes substantially equal (Japanese Patent Application No. 2011-210042).

CITATION LIST

Patent Literature

Patent Literature 1: Japanese Unexamined Patent Application Publication No. H5-193400

SUMMARY OF THE INVENTION

Problems to be Solved by the Invention

When a ratio of ON period and OFF period within a fame of each mirror of DMD changes, brightness of a display image to be displayed also changes, and a vehicle driver may feel unpleasant sensation.

Considering the above problem, the present invention has been made to provide a display device for vehicle, which can prolong the life of a display element even when used in a high temperature environment, and can prevent unpleasant sensation due to a change in brightness of a display image.

Means for Solving the Problem

In order to solve the above problem, according to a first aspect of the invention, there is provided a display device for vehicle, comprising a light source configured to be able to emit light of a plurality of colors; a light source control unit which performs field sequential color control of the light source based on a display image signal; a spatial light modulation element which is provided with a plurality of pixels for performing at least ON drive for spatial modulation of light from the light source in a predetermined direction, and OFF drive other than the ON drive, and is configured to generate a display image for each frame period in the predetermined direction based on the display image signal; and a light modulation element control unit which performs the ON drive or OFF drive of each of the pixels of the spatial light modulation element based on the display image signal, wherein the frame period includes a display period in which the light source control unit turns on the light source based on the display image signal, and the light modulation element control unit generates the display image in the spatial light modulation element, and a non-display period in which the light source control unit turns off all the light sources, and the light modulation element control unit simultaneously changes a drive current value and a drive period of the light source, when changing a display period ratio that is a ratio of the display period within the frame period in accordance with a specific condition. In such a configuration, the life of a display element can be prolonged even when used in a high temperature environment, and unpleasant sensation due to a change in brightness of a display image can be prevented.

According to a second aspect of the invention, there is provided a display device for vehicle, in which the light modulation element control unit simultaneously changes the drive current value and the drive period when changing the display period ratio, so that display brightness of the display image is not changed before and after changing the display period ratio. In such a configuration, the life of a display element can be prolonged even when used in a high temperature environment, and unpleasant sensation due to a change in brightness of a display image can be prevented.

According to a third aspect of the invention, there is provided a display device for vehicle, in which the light modulation element control unit drives the spatial light modulation element in the non-display period, so that an OFF drive period of each of the pixels in the frame period becomes longer than an ON drive period. As an OFF drive period of a hinge (a support point of a display element) given to each pixel of a display element is longer than an ON drive period, even when a pixel is fixed, possibility of fixation in an ON drive state can be lowered, thereby suppressing occurrence of a bright spot defect in particular, and loss of concentration of a viewer by watching a bright spot defect (display).

Effect of the Invention

An object of the present invention is to provide a field sequential display device for vehicle, which can prolong the life of a display element even when used in a high temperature environment, and can prevent unpleasant sensation due to a change in brightness of a display image.

MODES FOR CARRYING OUT THE INVENTION

Hereinafter, an explanation will be given to an embodiment, in which the present invention is applied to a display device for vehicle 1, with reference to the accompanying drawings.

Figure 1:
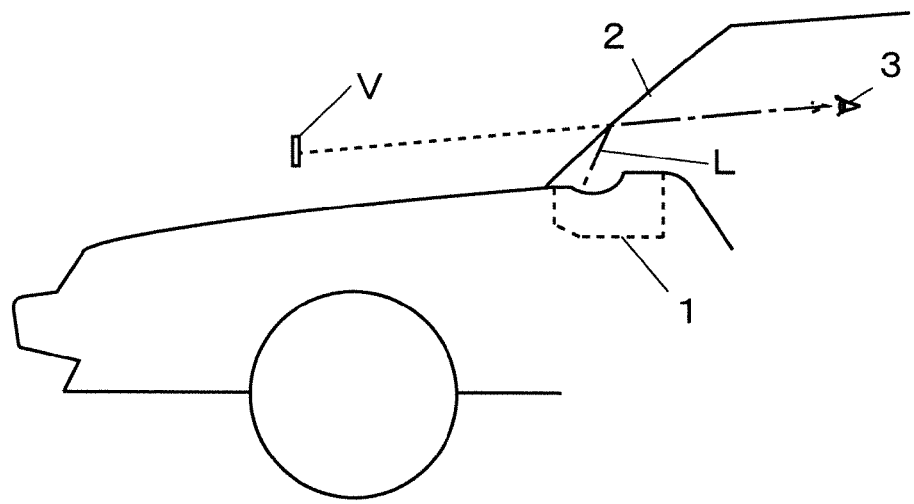
FIG. 1 is an overview of an embodiment of the present invention.

FIG. 1 shows an overview of an embodiment, in which a display device for vehicle 1, an embodiment of the invention, installed in a vehicle. The display device for vehicle 1 is provided in a dashboard of a vehicle, and is configured to make a vehicle driver 3 visually recognize a virtual image V of a display image M representative of vehicle information by reflecting a display light L representing a generated display image M by a windshield 2. A vehicle driver 3 can visually recognize a virtual image V without averting a line of sight from the front.

Figure 2:
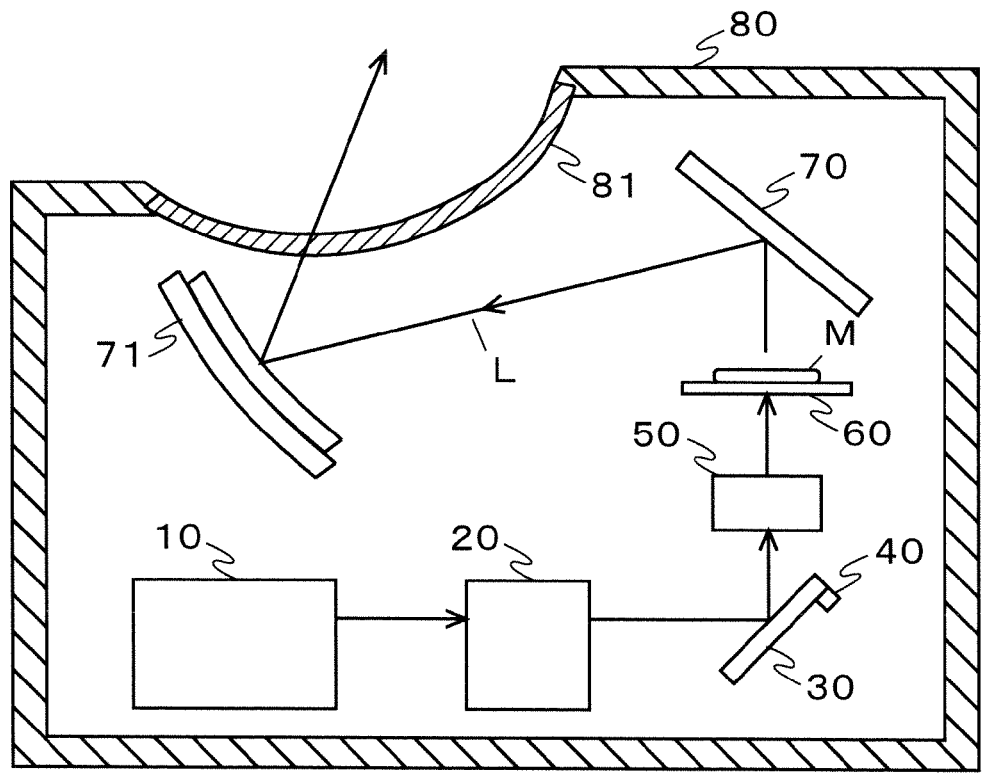
FIG. 2 is a side view of a display device of the embodiment.

FIG. 2 is a block diagram of a display device for vehicle 1 that is an embodiment of the invention. The display device for vehicle 1 comprises an illumination device 10, an illumination optics 20, a display element 30, a temperature detection means 40, a projection optics 50, a screen 60, a plane mirror 70, a concave mirror 71, a housing 80 provided with a window part 81 for emitting a display light L to the outside, and a control unit 90.

Figure 3:
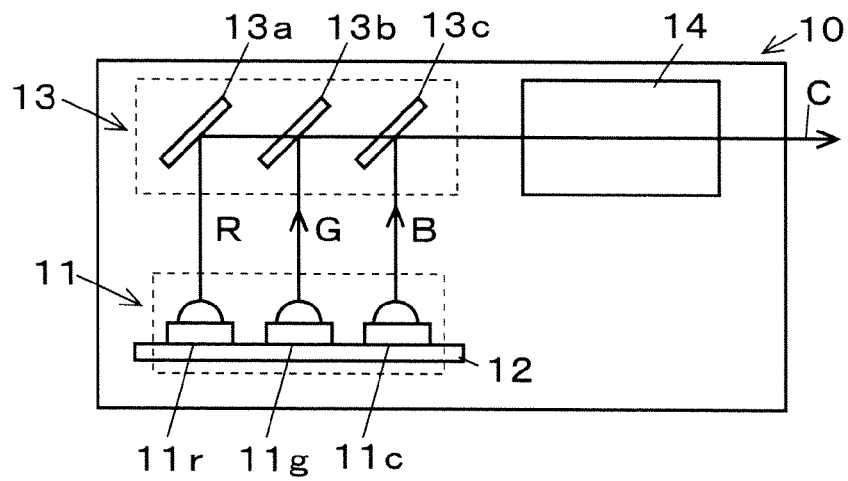
FIG. 3 is a conceptual view of an illumination device for generating an illumination light in the embodiment.

The illumination device 10 comprises, as shown in FIG. 3, a circuit board 12 made of an aluminum substrate for implementing the light source 11, a reflection/transmission optical means 13, and an uneven brightness reduction optical means 14.

The light source 11 comprises a red LED 11r for emitting a red illumination light R, a green LED 11g for emitting a green illumination light G, and a blue LED 11b for emitting a blue illumination light B.

The reflection/transmission optical means 13 comprises a reflection mirror 13a for reflecting light, and dichroic mirrors 13b and 13c, which are composed of a mirror with a thin film such as a dielectric multiplayer film formed on a mirror surface, and are configured to transmit and reflect light.

The reflection mirror 13a is arranged at a predetermined angle in an advancing direction of light emitted from the red LED 11r, and reflects a red illumination light R from the red LED 11r.

The dichroic mirror 13b is arranged at a predetermined angle in an advancing direction of a green illumination light G emitted from the green LED 11g, transmits a light R reflected by the reflection mirror 13a, and reflects a green illumination light G.

The dichroic mirror 13c is arranged at a predetermined angle in an advancing direction of a blue illumination light B emitted from the blue LED 11b, transmits a red illumination light R and green illumination light G reflected by the reflection mirror 13b, and reflects a blue illumination light B.

The uneven brightness reduction optical mans 14 comprises a mirror box, and an array lens or the like, and reduces unevenness of light by diffusely reflecting, scattering, or refracting the illumination light C. As described above, the illumination device 10 emits the illumination light C toward an illumination optics 20 described later.

The illumination optics 20 comprises a concave lens or the like, and adjusts the illumination light C emitted from the illumination device 10 to the size of a display element 30 described later.

The display element 30 comprises a digital micro-mirror device (DMD) that is provided with a plurality of movable mirrors E (a pixel in Claims). A surface of each mirror E can be inclined ±12 degrees around a hinge by providing two states of ON and OFF by driving an electrode provided under the mirror E in a very short time of microsecond order. When the mirror E is ON, the mirror inclines +12 degrees around a hinge, and reflects the illumination light C emitted from the illumination optics 20 toward the projection optics 50 described later. In the OFF state, the mirror inclines −12 degrees around a hinge, and does not reflect the illumination light C to the projection optics 50. Thus, the display image M is projected toward the projection optics 50 by individually driving each mirror E based on display image data representing a display image M.

Other than the ON and OFF states, when power of the display device for vehicle 1 is turned off, each mirror E of the display element 30 is controlled at a midpoint between the inclinations in ON control and OFF control. The midpoint is at a position of 0 degree in the embodiment.

The temperature detection means 40 comprises a temperature sensor 41 that is composed of a thermistor or the like incorporated in a ceramic part of a base substrate of the display element 30, and an A/D converter 42. The temperature sensor 41 measures a temperature of the display element 30, converts analog data outputted from the temperature sensor 41 into digital data by the A/D converter 42, and outputs temperature data T to the control unit 90. The A/D converter 42 may be incorporated in the control unit 90.

The temperature sensor 41 may not measure a temperature of the display element 30, and may measure a temperature in or around the housing 80 that affects a temperature of the display element 30.

The temperature sensor 41 may be provided on a control substrate (not shown) on which the control unit 90 is mounted, and may remotely measure a temperature of the display element 30 from a control substrate.

The projection optics 50 is composed of a concave lens or a convex lens or the like, and is configured to efficiently emit a display light L of a display image M projected from the display element 30 onto the screen 60 described later.

The screen 60 comprises a diffusion plate, a holographic diffuser, and a microlens array or the like, and receives a display light L from the projection optics 50 by a lower side, and displays a display image M on an upper side.

The plane mirror 70 reflects the display image M displayed on the screen 60 toward a concave mirror 71 described later.

The concave mirror 71 is a concave mirror or the like, and emits a display light L from the window part 81 described later to the outside of the display device for vehicle 1 by reflecting the display light L reflected by the plane mirror 70. Thus, a virtual image V to be formed has a size of a display image M that is displayed on the screen 60 and magnified.

The housing 80 is made of hard resin, and formed in a box shape provided with the window part 81 of a predetermined size in the upper part. The housing 80 contains an illumination device 10, an illumination optics 20, a display element 30, a temperature detection means 40, a projection optics 50, a screen 60, a plane mirror 70, and a concave mirror 71 or the like in predetermined positions. The control unit 90 described later may be housed in the housing 80, or may be arranged outside the housing 80 and electrically connected by wiring to the components inside the housing 80.

The window part 81 is made of translucent resin such as acryl, formed in a curved shape, and fixed to an opening of the housing 80 by welding or the like. The window part 81 transmits light reflected by the concave mirror 71.

Figure 4:
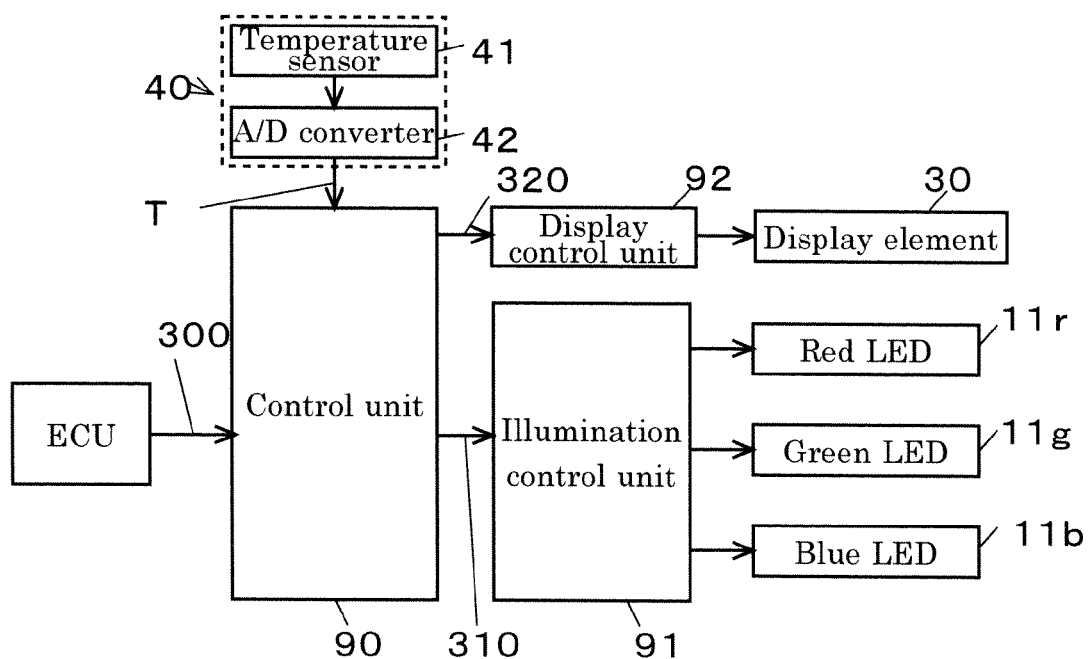
FIG. 4 is an explanatory diagram of an electrical configuration of the embodiment.

Next, an explanation will be given to an electrical configuration of the display device for vehicle 1 by referring to FIG. 4. FIG. 4 is an explanatory diagram of an electrical configuration of the embodiment.

The control unit 90 comprises a field programmable gate array (FPGA) or a microcomputer, a CPU such as an ASIC, and a memory to store a program and data for driving the CPU. The control unit 90 is externally supplied with a display image signal 300 for displaying a display image M by low voltage differential signal (LVDS) communication or the like, and supplies the illumination control unit 91 and the display control unit 92 respectively with illumination control data 310 for controlling the illumination device 10 with the brightness and at the emission timing required by the display image signal 300, and display control data 320 for displaying a display image M requested by the display image signal 300 in the display element 30. Thus, the display device for vehicle 1 generates a display image M. Thus, the display device for vehicle 1 generates a display image M.

In the display device for vehicle 1 of the present invention, field sequential color (FSC) control is performed as a method of generating a display image M. In the FSC control in the embodiment, a frame F (a frame period in Claims) that is a cycle to constitute a display image M is set to less than 1/60 seconds (60 Hz or more) that is higher than a critical fusion frequency to enable a person to visually recognize a flicker. The frame F is divided into 1/180 seconds for each of a red LED 11r, a green LED 11g, and a blue LED 11b as a drive period. Further, a drive period of each color (1/180 seconds) is divided into a sub-frame SF of an unequal period to enable 8-bit time gradation. Setting of FSC control in the embodiment is conceptually explained, and is not limited to this explanation.

The illumination control unit (light source control unit) 91 performs FSC control, which sequentially switches at high speed the light source 11 of different colors (the red LED 11r, green LED 11g, and blue LED 11b) for each sub-frame SF, with the light intensity and at the timing required by the illumination control data 310. The illumination control data 310 represents a sub-frame SF in which the light source 11 turns on, a turn-on timing, a drive current I to drive the light source 11, a drive period H, and so on. The illumination control unit 91 drives the light source 11 at a desired timing, drive current I, and drive period H in the selected sub-frame FS based on the illumination control data 310.

The display control unit 92 is configured to perform ON drive to incline each mirror E of the display element 30 +12 degrees, and OFF drive to incline the mirror −12 degrees, based on the display control data 320. The display control data 320 is generated for each mirror E of the display element 30, and represents an ON drive timing, an ON drive period, and so on to enable the mirror to represent a desired display brightness and display color. The display control unit 92 performs ON/OFF drive of each mirror at a desired timing and ON drive period in a sub-frame SF based on the display control data 320.

In other words, for constituting a display image M, the illumination device 10 illuminates the display element 30 by outputting an illumination light C (a red illumination light R, a green illumination light G, and a blue illumination light B) for each desired sub-frame SF at a desired light intensity. For generating a display image M, each mirror E of the display element 30 reflects the illumination light C toward the screen 60 for each mirror E at a desired timing. In such a configuration, a display image M is expressed in color by time division addition mixing of basic colors, that is, red illumination light R, green illumination light G, and blue illumination light B of the light source 11.

Figure 5:
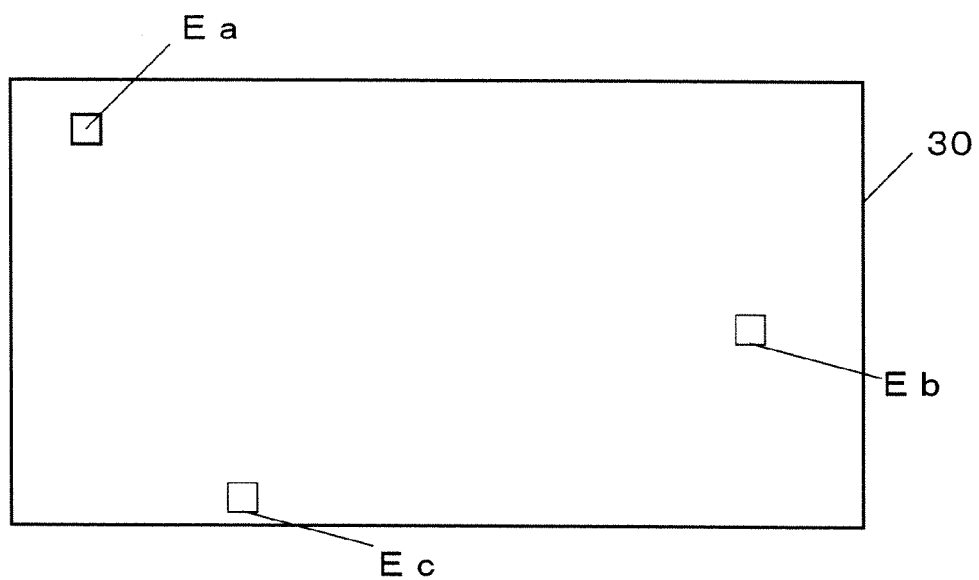
FIG. 5 is a schematic diagram of a display element of the embodiment.
Figure 6:
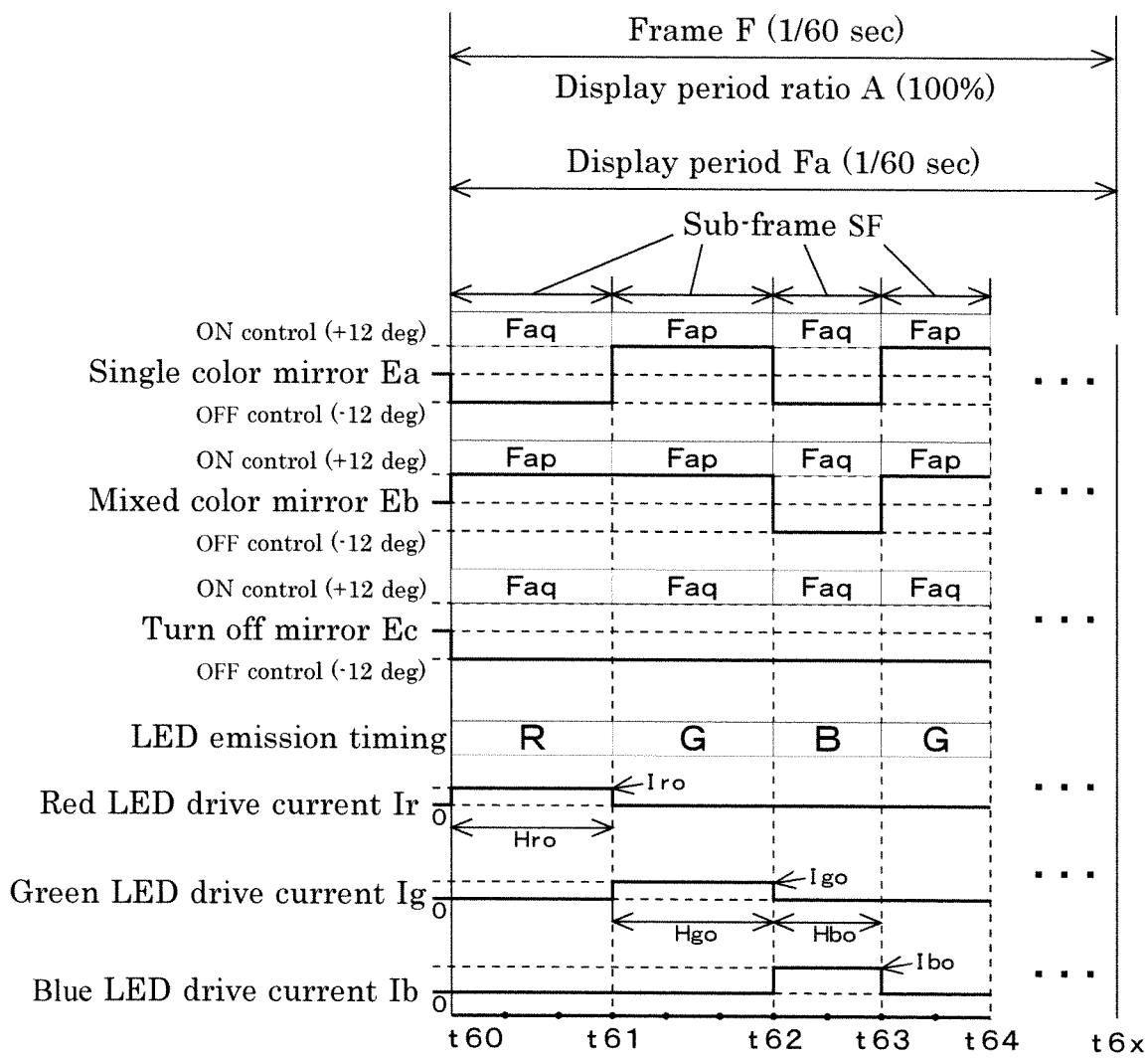
FIG. 6 is a time chart representing operation within a frame of a display device for vehicle of the embodiment when a non-display period is not provided.

Specific operations of the illumination device 10 and display element 30 by such a FSC control will be explained by using FIG. 5 and FIG. 6. FIG. 5 is a schematic diagram of the display element 30 provided with a plurality of mirrors E (a single color mirror Ea, a mixed color mirror Eb, and a turn off mirror Ec). FIG. 6 is a time chart representing operation of each mirror E (a single color mirror Ea, a mixed color mirror Eb, and a turn off mirror Ec) of the display device 30, and operation of the light source 11 (a red LED 11r, a green LED 11g, and a blue LED 11b).

The single color mirror Ea representing a single color in the display element 30 reflects a green illumination light G of the green LED 11g in a predetermined direction by being driven on in accordance with the timing (t61 to t62) the green LED 11g emits light as shown in FIG. 6, for example. The mixed color Eb representing a mixed color in the display element 30 reflects a mixed color light of a red illumination light R and a green illumination light G in a predetermined direction by being driven on in accordance with the timing (t60 to t61 and t61 to t62) the red LED 11r and the green LED 11g emits light as shown in FIG. 6, for example. The turn off mirror Ec representing nothing in the display element 30 reflects no light displays nothing by being driven off at all timing (t60 to tx) as shown in FIG. 6, for example.

Operation of the display device for vehicle 1 with the above configuration configured up to displaying a virtual image V is briefly described below.

(1) The control unit 90 generates illumination control data 310 and display control data 320 based on an external display image signal 300.

(2) The illumination device 10 emits an illumination light C to the display element 30 by FSC control based on the illumination control data 310.

(3) The display element 30 projects an illumination light C as a display image M from the illumination device 10 to the screen 60 by turning ON/OFF of the individual mirrors E of the display element 30 based on the display control data 320.

(4) A display light L representing a display image M displayed on the screen 60 is reflected to the concave mirror 71 by the plane mirror 70.

(5) A display image M is magnified to a predetermined size by the concave mirror 71, and a display light L representing the magnified display image M is reflected by the windowshield 2, thereby a virtual image V of the display image M is formed in front of the windshield 2. In such a manner, the display device for vehicle 1 enables a vehicle driver 3 to visually recognize a display image M as a virtual image V.

Figure 7:
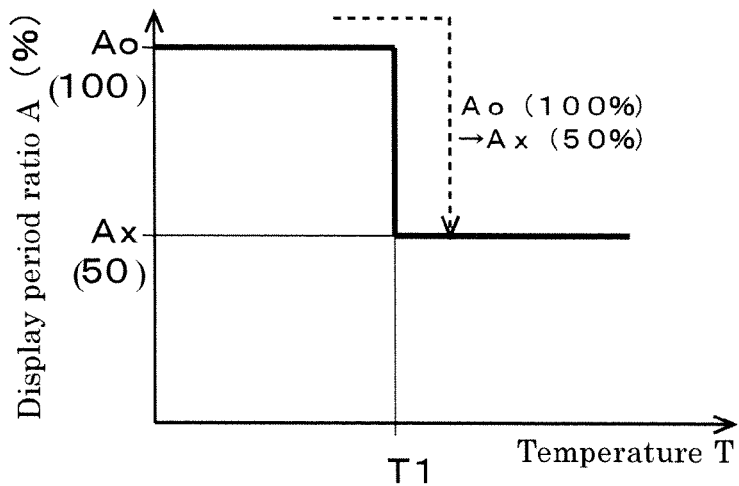
FIG. 7 is an explanatory diagram representing changes in a display period ratio A, a drive current I, and a drive period H based on a temperature T in the embodiment: (a) representing a temperature characteristic of a display period ratio A, (b) representing a temperature characteristic of a drive current I, and (c) representing a temperature characteristic of a drive period H.
Figure 7:
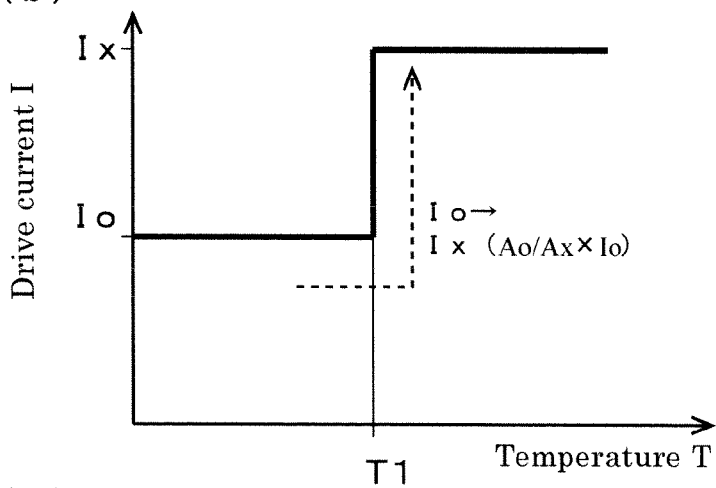
Figure 7:
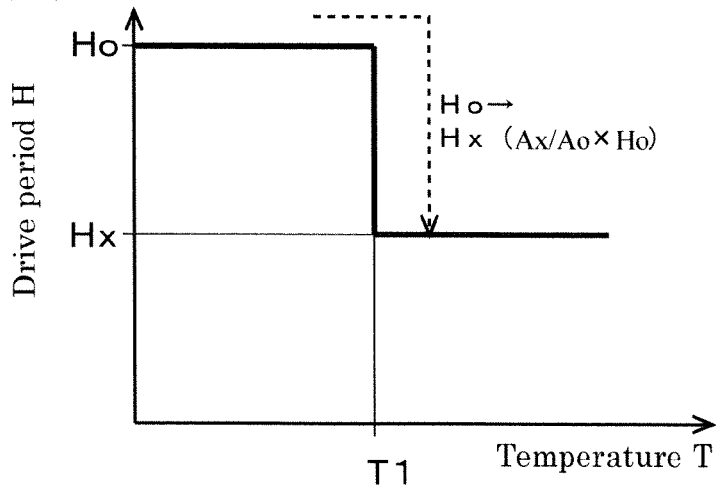

Next, an explanation will be given to a non-display period Fb in the display device for vehicle 1 of the embodiment. FIG. 7(a) is a temperature characteristic diagram representing a display period ratio Fa within a frame F previously stored in a memory of the control unit 90. When a temperature T of the display element 30 rises higher than a first temperature threshold value T1 measured by the temperature detection means 40, the display device for vehicle 1 of the embodiment provides a non-display period Fb of about 0.5 (50%) within the frame F based on the temperature characteristic diagram of a display period ratio A as shown in FIG. 7(a) previously stored in a memory. When the temperature T is lower than the first temperature threshold value T1, the control unit 90 does not provides a non-display period Fb within a frame F, and only a display period Fa for generating a display image M is provided. By providing a display period Fa only within a frame F as described above, a high brightness display image M can be generated, and fixation of the display element 30 to each mirror E can be suppressed only at a required high temperature (when the temperature T rises over the first temperature threshold value T1). Further, even when the temperature T is lower than the first temperature threshold value T1, a non-display period Fb may be provided several percents within the frame F to reduce a load on each mirror E.

When the temperature T is higher than the first threshold value T1 as described above, as shown in FIG. 8, a display period Fa and a non-display period Fb are provided in 0.5 (50%) each within a frame F.

In the display period Fa, the illumination control unit 91 performs FSC control, which sequentially switches at high speed the light source 11 of different colors (the red LED 11r, green LED 11g, and blue LED 11b) for each sub-frame SF, with the light intensity and at the timing required by the illumination control data 310. The display control unit 92 performs ON drive to incline each mirror E of the display element 30 by +12 degrees, OFF drive to incline the mirror −12 degrees, based on the display control data 320. In other words, an ON drive ratio in a display period Fap and an OFF drive ratio in a display period Faq, which represents a ratio of ON/OFF drive of a mirror E in a display period Fa, is different depending on a display brightness and a display color represented by each mirror E (the display control data 320 entered from each mirror E).

In the non-display period Fb, the illumination control unit 91 turns off all light sources 11, and the display control unit 92 performs ON/OFF drive of each mirror E, thereby controlling an ON drive ratio P in a frame, which is a ratio of ON drive of each mirror within a frame F, to about 0.5 (50%). In other words, an ON drive ratio in a non-display period Fbp and an OFF drive ratio in a non-display period Fbq, which represent an ON/OFF drive ratio of a mirror E in a non-display period Fb, is controlled so that an ON drive ratio in a frame P becomes 0.5 (50%). Thus, by controlling the ON drive ratio in a frame of each mirror E within a frame F to about 0.5 (50%) (making the ON drive ratio and the OFF drive ratio substantially equal) as described above, a load on a hinge of each mirror E (a support point of a mirror E) can be made equal on the ON drive side and OFF drive side, fixation of a mirror E in one of the ON/OFF state can be suppressed, and the life of the display element 30 can be kept long even when used in a high temperature environment.

Figure 8:
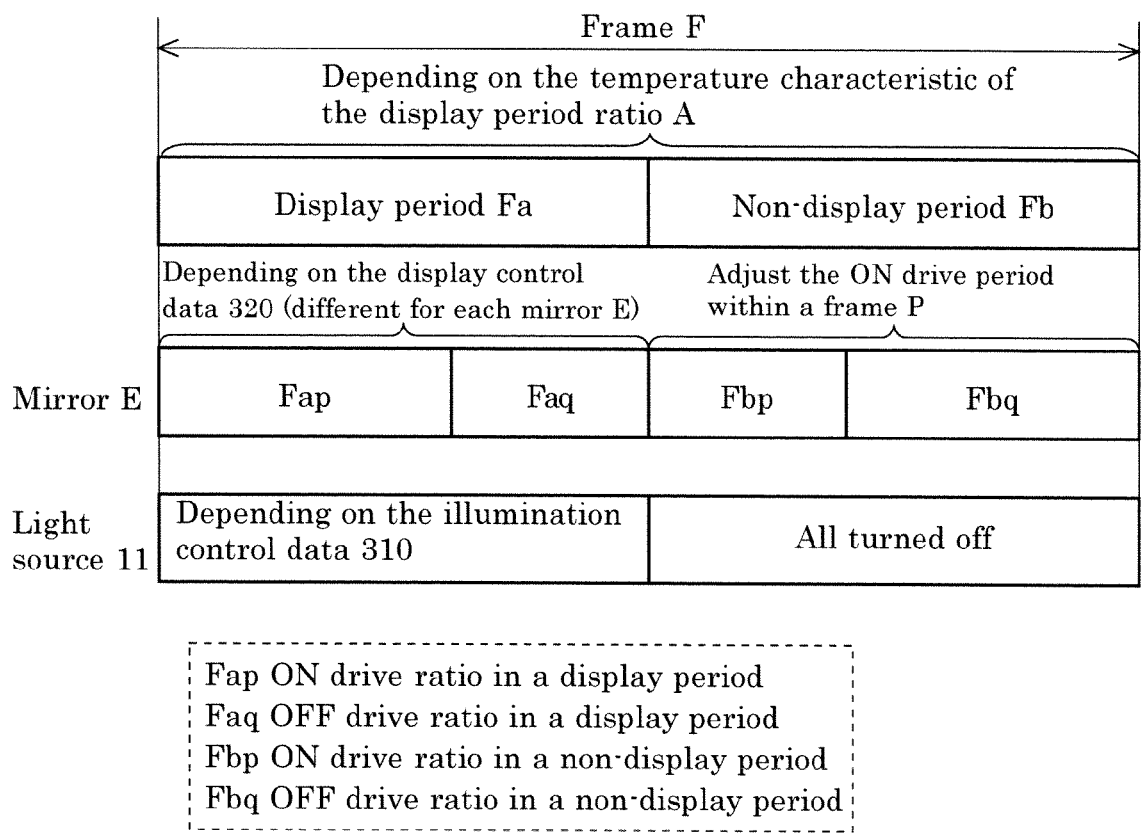
FIG. 8 is an explanatory diagram representing a relationship between a display period Fa and a non-display period Fb in the embodiment.
Figure 9:
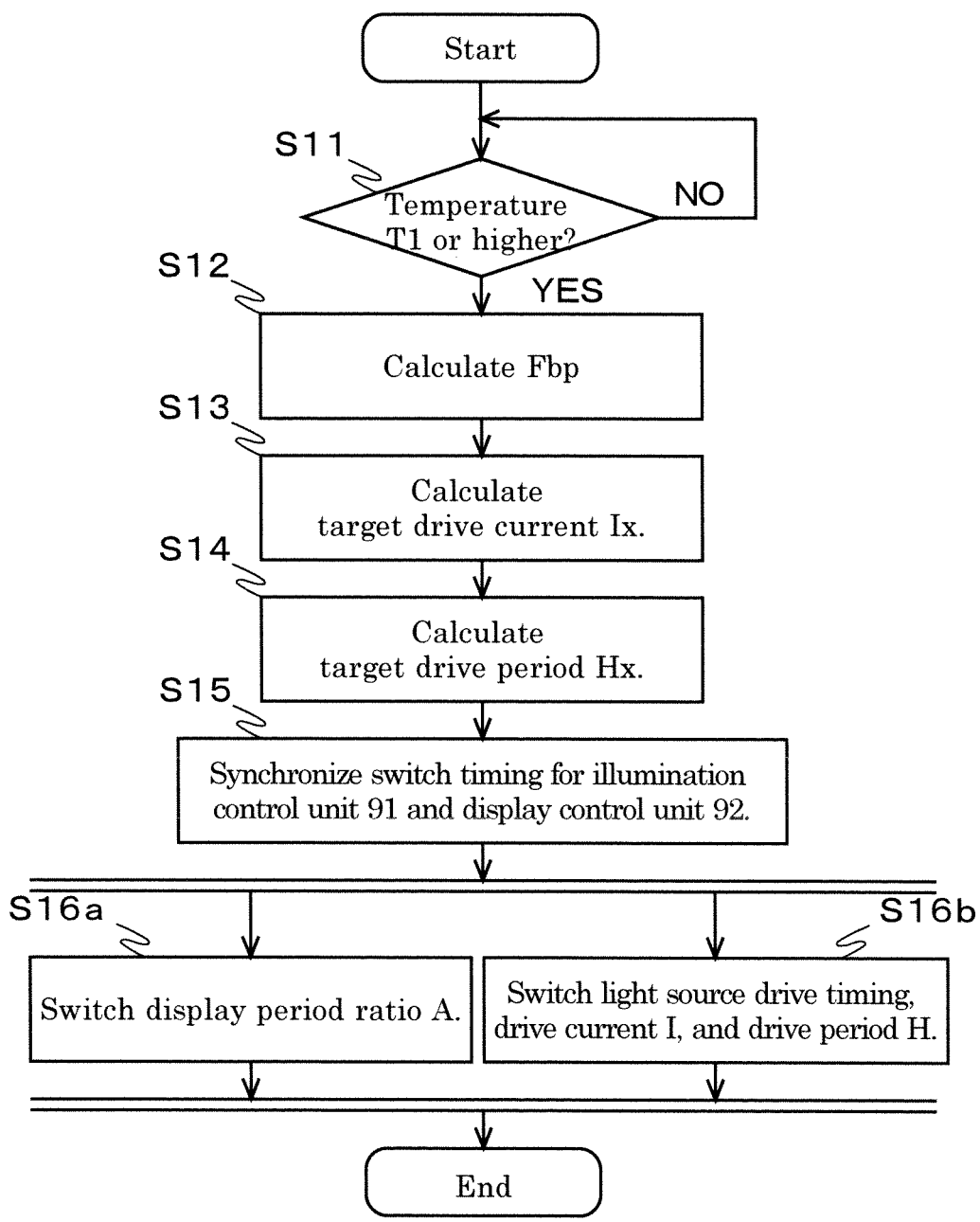
FIG. 9 is a flowchart representing operation of a display device for vehicle in the embodiment at the time of changing a display period ratio A based on a temperature.
Figure 10:
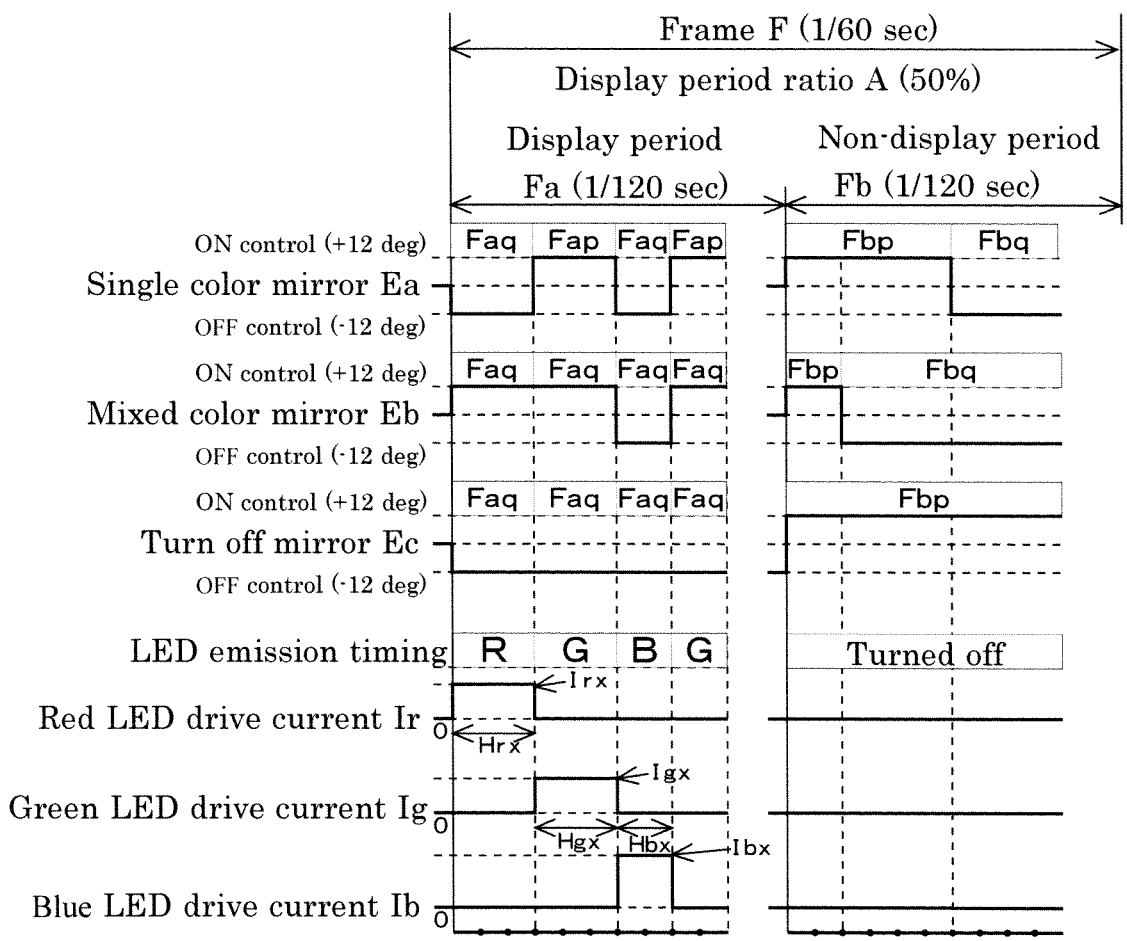
FIG. 10 is a time chart representing operation of a display device for vehicle in the embodiment after changing a display period ratio A based on a temperature T.

An explanation will be given to operation of the display device for vehicle 1 at the time of providing a non-display period Fb by referring to FIGS. 8 (b) and (c), FIG. 9, and FIG. 10. FIGS. 8 (b) and (c) show changes in a drive current I and a drive period H of driving the light source 11 when a display period ratio A is changed. FIG. 9 is a flowchart representing operation of the display device for vehicle 1 when a display period ratio A is switched based on a temperature T. FIG. 10 is a time chart explaining operation of each mirror E of the display element 30 and the light source 11 when a display period ratio A becomes 0.5 (50%).

In step S11 of the flowchart of FIG. 9, the control unit 90 determines whether the temperature T of the display element 30 detected by the temperature detection means 40 is higher than the first temperature threshold value T1. When the temperature is determined to b higher than the first temperature threshold T1, the control unit 90 calculates in step S12 the ON drive ratio in a non-display period Fbp that is an ON drive ratio of the mirror E in the non-display period Fb, so that the ON drive ration within a frame P becomes 0.5 (50%). The ON drive ratio in the non-display period Fbp is calculated by Equation 1 from an ON drive ratio in a frame P, an ON drive ration in a non-display period, and a display period ratio A.

[Equation 1]

$$P = Fap \times A + Fbp \times (1-A) \quad \text{(Equation 1)}$$

In practical calculation of the ON drive ratio in the non-display period Fbp of the single color mirror E shown in FIG. 10, the ON drive ration in a frame P is set to 0.5 (50%) to make a load on a hinge of a mirror E of the display element 30 equal on the ON drive side and OFF drive side, and the display period ratio A is set based on the temperature characteristic previously stored in the memory 91 as shown in FIG. 7(a). Thus, the ON drive ratio in the non-display period Fbp is set to 0.5 (50%) in the embodiment. Assuming the ON drive ratio in a display period Fap to be a computationally 0.4 (40%), though depending on a display brightness and a display color represented by each mirror, the ON drive ratio in the non-display period Fbp is calculated to be 0.6 (60%). In other words, as to the single color mirror Ea in FIG. 10, by setting the ON drive to 60% (OFF drive is 40%) in the non-display display period Fb, the ON drive and OFF drive ratios within the frame F become equal (the ON drive ratio P in a frame becomes 0.5 (50%)). Thus, by making a load on a hinge of the mirror E (a support point of the mirror E) equal on the ON drive side and OFF drive side, fixation of the mirror E in one of ON/OFF states can be suppressed.

Similarly, in the mixed color mirror Eb in FIG. 10, as the ON drive ratio in a display period Fap is 0.8 (80%), the ON drive ratio in a non-display period Fbp is calculated to be 0.2 (20%). In the turn off mirror EC, as the ON drive ratio in a display period Fap is 0 (0%), the ON drive ratio in a non-display period Fbp is calculated to be 1.0 (100%).

In step S13, the control unit 90 calculates a target drive current Ix that is a drive current I of the light source 11 to be switched in step S16b described later (a target red LED drive current Irx, a target green LED drive current Igx, and a target blue LED drive current Ibx), based on a drive current before switching Io that is a drive current I of the light source 11 before switching in step S16b described later (a red LED drive current before switching Iro, a green LED drive current before switching Igo, and a blue LED drive current before switching Ibo).

The target drive current Ix is calculated by Equation 2 from a display period ratio before switching A0 that is a display period A before switching in step S16a described later, and a target display period ratio Ax that is a display period ratio A to be switched in step S16a described later. In the embodiment, as the display period ratio Ao is 1.0 (100%) and the target display period ratio Ax is 0.5 (50%), the target drive current Ix is twice the drive current before switching Io.

[Equation 2]

$$\text{Target drive current } Ix = \frac{\text{Display period ratio before switching } Ao}{\text{Target display period ratio } Ax} \times \text{Drive current before switching } Io \quad \text{(Equation 2)}$$

Further, in step S14, the control unit 90 calculates a target drive period Hx that is a drive period H of the light source 11 to be switched in step S16b described later (a target red LED drive period Hrx, a target green LED drive period Hgx, and a target blue LED drive period Hbx), based on a drive period before switching Ho that is a drive period H of the light source 11 before switching in step S16b described later (a red LED drive period before switching Hro, a green LED drive period before switching Hgo, and a blue LED drive period before switching Hbo).

The target drive period Hx is calculated by Equation 3 from a display period ratio before switching A0 that is a display period ratio before switching A in step S16a described later, and a target display period ratio Ax that is a display period ratio A to be switched in step S16a described later. In the embodiment, as the display period ratio before switching Ao is 1.0 (100%) and the target display period ratio Ax is 0.5 (50%), the target drive current Ix is 0.5 times the drive current before switching Io.

[Equation 3]

$$\text{Target drive period } Hx = \frac{\text{Target display period ratio } Ax}{\text{Display period ratio before switching } Ao} \times \text{Drive period ratio before switching } Ho \quad \text{(Equation 3)}$$

In step S15, after the above calculation is completed, the control unit 90 synchronizes the timing of switching the illumination control unit 91 and display control unit 92, namely determines the switching timing (e.g., third frames after the calculation), based on the data stored in the memory.

At the timing adjusted in step S15, as shown below, the control unit 90 simultaneously performs switching of a display period ratio A of each mirror E of the display element 30 (S16a) to be done through the display control unit 92, and switching of a drive timing, drive current I, and drive period H of the light source 11 (S16b) to be done through the illumination control unit 91.

In step S16a, through the display control unit 92, the control unit 90 switches a display period ratio A of each mirror E of the display element 30 from the display period before switching Ao (1.0 (100%)) to the target display period ratio Ax (0.5 (50%)), and in the non-display period Fb, performs ON/OFF drive so as to set the ON drive period in a non-display period Fbp calculated in step S11.

In step S16a, when the display period ratio A is switched from the display period ratio before switching Ao to the target display period Ax, the timing of the sub-frame SF is accordingly changed.

In step S16b, through the illumination control unit 92, the control unit 90 adjusts a drive timing of the light source 11 to the timing of the sub-frame S changed in step S16a, and further switches the drive current I of the light source 11 (the red LED drive current Ir, green LED drive current Ig, and blue LED drive current Ib) to the target drive current Ix (the target red LED drive current Irx, target green LED drive current Igx, and target blue LED drive current Ibx), and switches the drive period H of the light source 11 (the red LED drive period Hr, green LED drive period Hg, and blue LED drive period Hb) to the target drive period Hx (the target red LED drive period Hrx, target green LED drive period Hgx, and target blue LED drive period Hbx).

In the above configuration, when the temperature T of the display element 30 rises higher than the first temperature threshold value T1 previously stored in the memory, the display device for vehicle 1 of the embodiment provides a non-display period Fb within the frame F based on the temperature characteristic of the display period ratio A stored in the memory, and performs ON/OFF drive of each mirror E of the display element 30 so that the ON drive ratio and OFF drive ratio within the frame F becomes substantially equal (the ON drive ratio in a frame P becomes 0.5 (50%)). Thus, the load on a hinge of each mirror E (a support point of a mirror E) becomes equal on the ON drive side and OFF drive side, fixation of the mirror E in one of ON and OFF states can be suppressed, and the life the display element 30 can be kept long even when used in a high temperature environment. Further, as the drive timing, the drive current I, and the drive period H of the light source display element 30, even when the temperature T rises higher than the first temperature threshold value T1 and the ON drive ratio in a frame P is changed, a change in display brightness of a virtual image (a display image M) can be prevented, and unpleasant sensation that a vehicle driver 3 may feel can be suppressed.

Further, in the aforementioned embodiment, the ON drive ratio in a frame P when the temperature T of the display element 30 rises higher than the first temperature threshold value T1 is set to 50%, but it is desirable to make the OFF drive period a little longer than the ON drive period, for example, setting the ON drive of each mirror E within a frame to 49% and the OFF drive to 51%.

In such a configuration, even when the mirror E is fixed, the possibility of fixation of the mirror E in the ON drive state can be extremely reduced, and the possibility of a bright spot defect that reflects the illumination light C to the screen 50 can be extremely reduced. Thus, it is possible to suppress loss of driving concentration of a person, who visually recognizes the display device for vehicle of the embodiment, due to watching a bright spot defect (display).

For the same reason, it is desirable to set the non-display period in a frame Fb longer than the display period Fa.

The embodiment described hereinbefore is a first embodiment of the present invention. Modifications of the embodiment will be explained with reference to the drawings.

Second Embodiment

Figure 11:
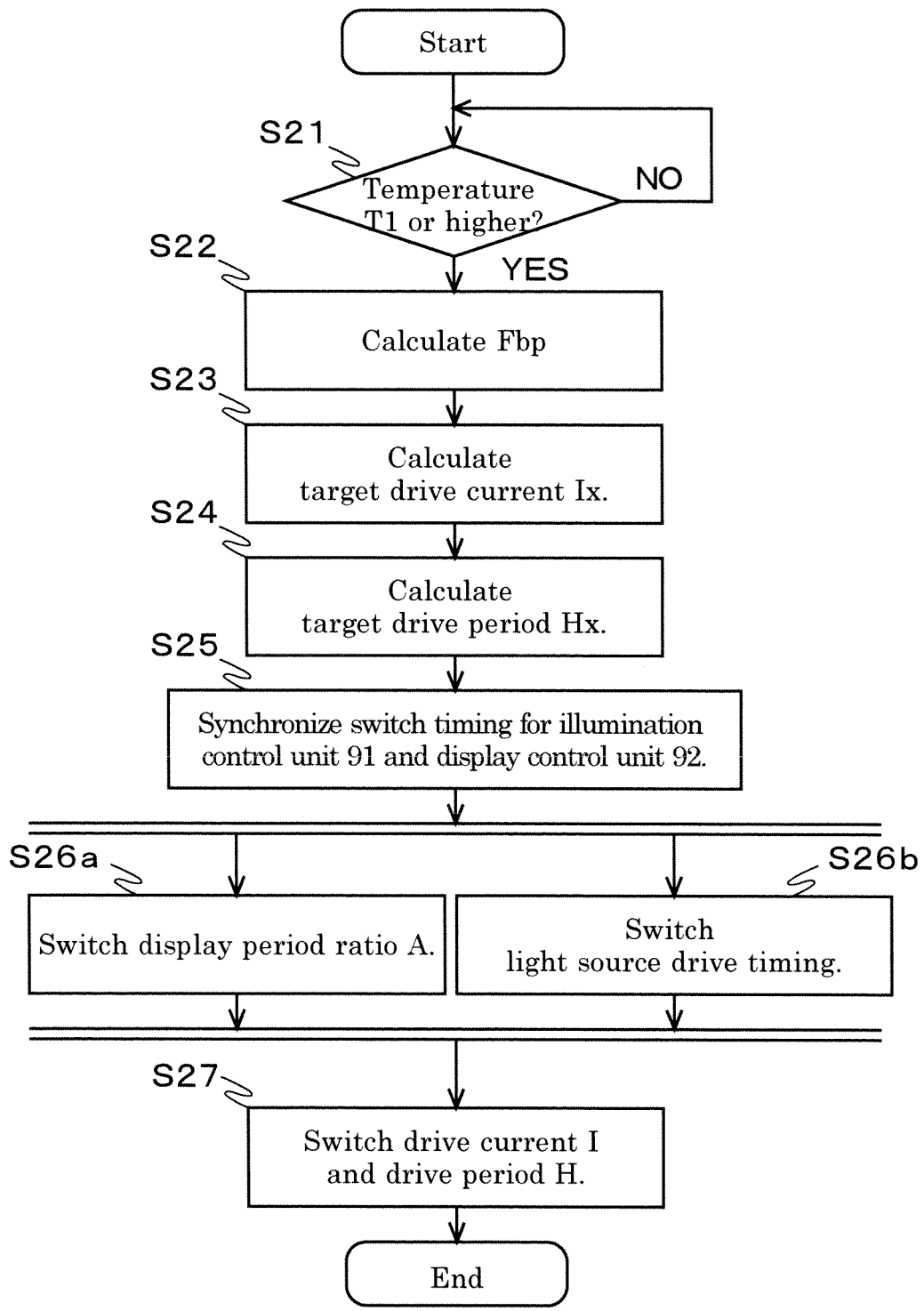
FIG. 11 is a flowchart representing operation of a display device for vehicle of a second embodiment of the invention at the time of changing a display period ratio A based on a temperature.
Figure 12:
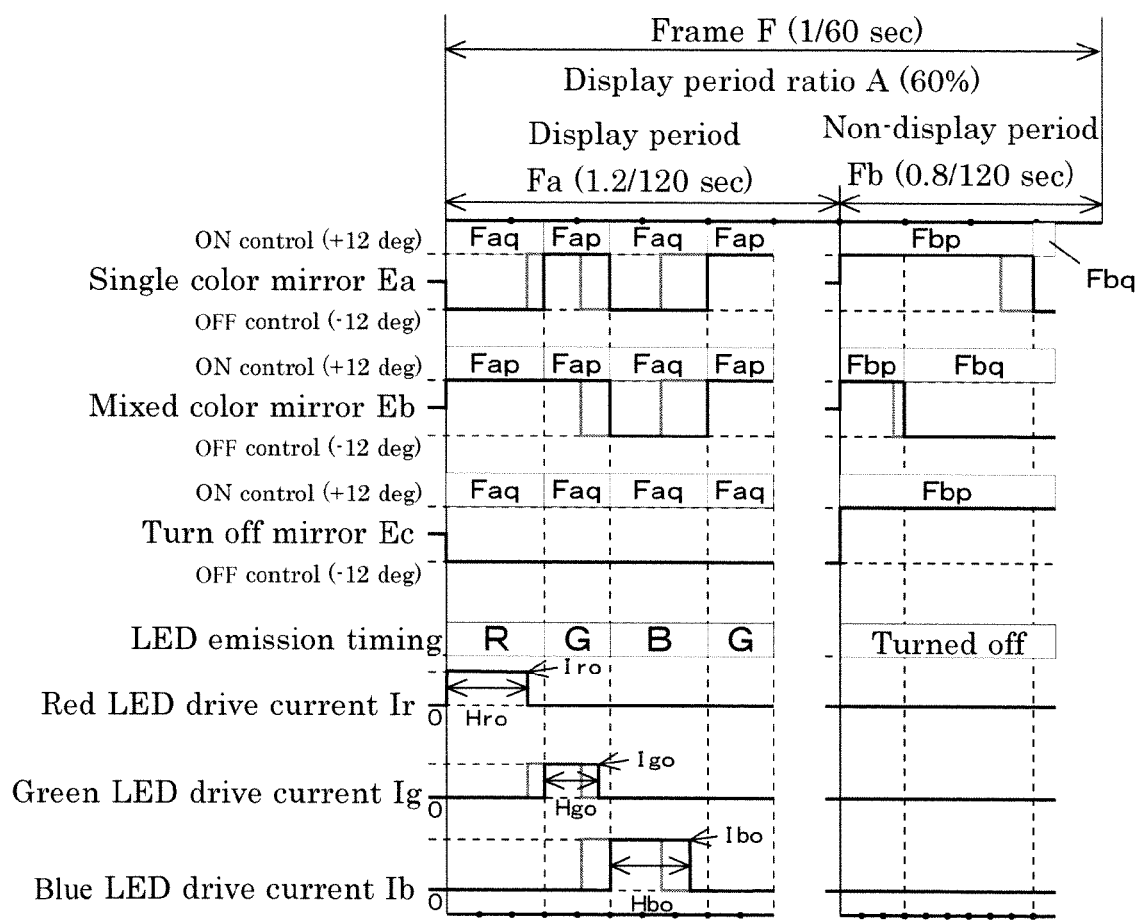
FIG. 12 is a time chart representing operation of a display device for vehicle of the second embodiment of the invention.

FIG. 11 is a flowchart of the display device for vehicle 1 in a second embodiment of the invention. FIG. 12 is a time chart representing operation of the display element 30 and light source 11 after step S26 in FIG. 11. In the first embodiment, the drive timing, drive current I, and drive period H of the light source 11 are simultaneously changed. In step S26a, the display period ratio A of each mirror E of the display element 30 may be switched. In step S26b, the drive timing of the light source 11 may be switched in accordance with the switching of the display period ratio A. In step S27, the drive current I and drive period H of the light source may be switched to the target drive current Ix and target drive period Hx, respectively in accordance with the sub-frame SF. In steps S26a and S26b, only the emission timing of the light source 11 is adjusted based on the switching of the display period ratio A of each mirror E of the display element 30, and the brightness of the display image M in the display element 30 is not changed from before the switching.

Third Embodiment

Figure 13:
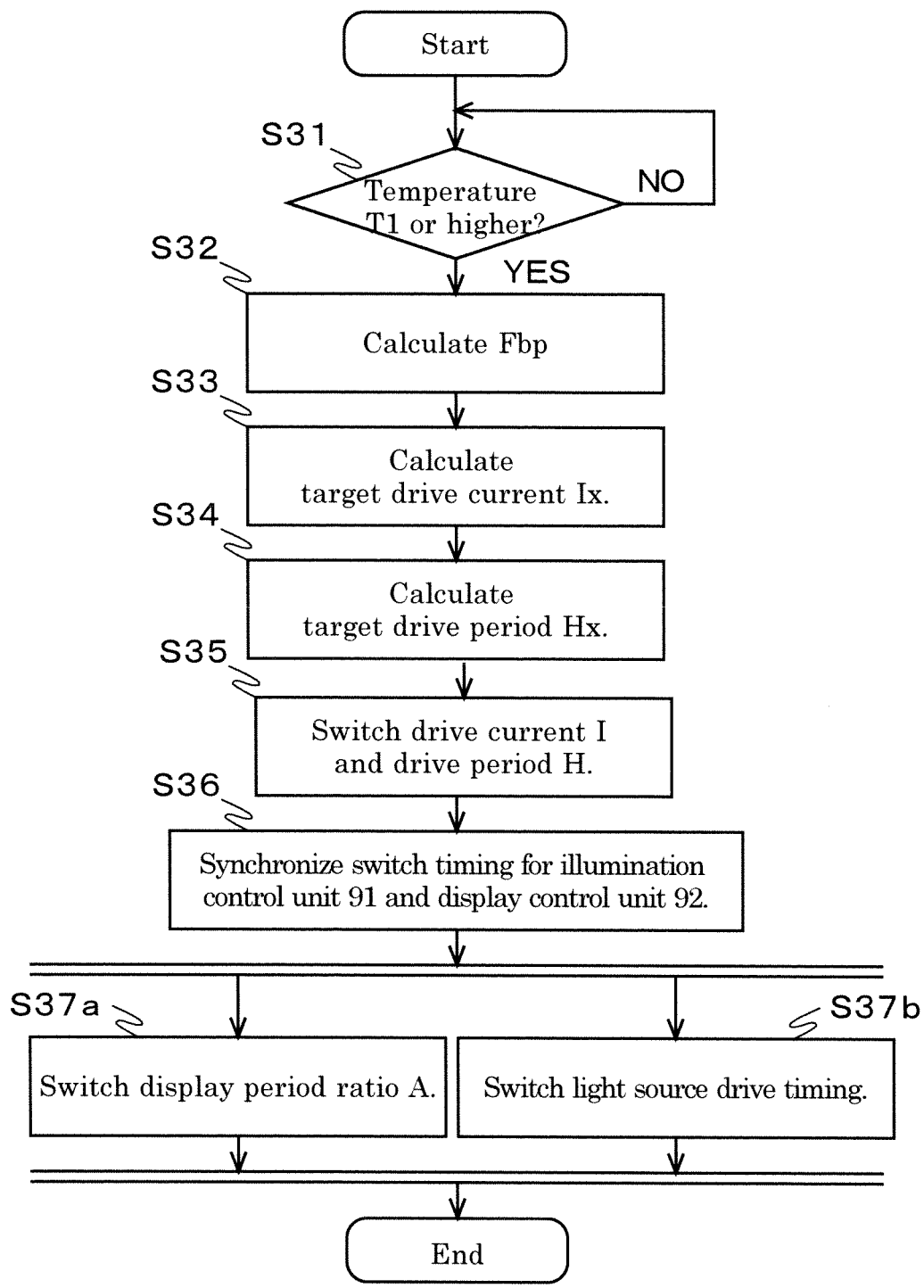
FIG. 13 is a flowchart representing operation of a display device for vehicle of a third embodiment of the invention at the time of changing a display period ratio A based on a temperature.
Figure 14:
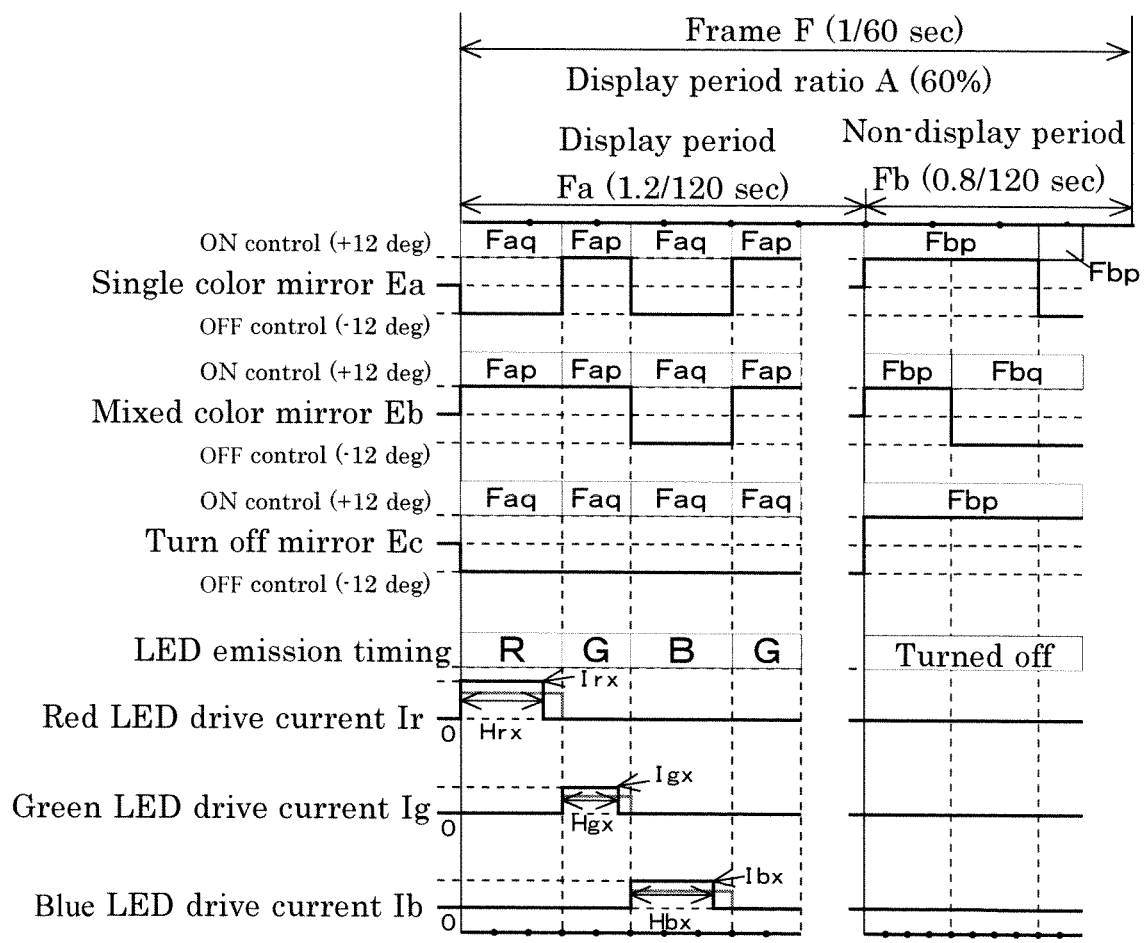
FIG. 14 is a time chart representing operation of a display device for vehicle of a third embodiment of the invention.
Figure 15:
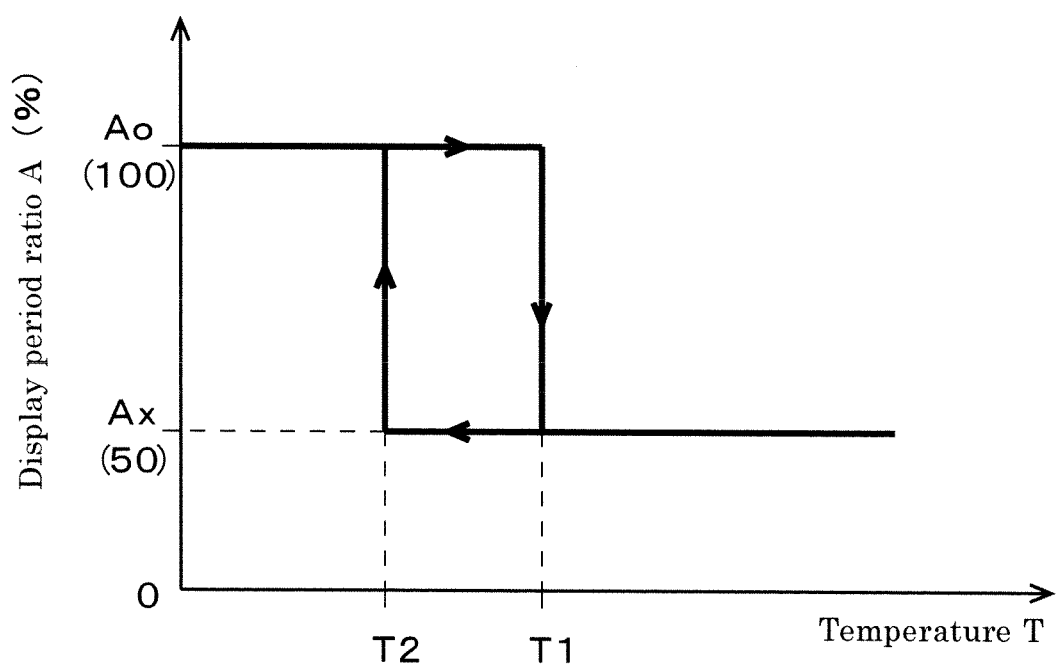
FIG. 15 shows a modification of a display period ratio A based on a temperature T in the embodiment.

FIG. 13 is a flowchart of the display device for vehicle 1 in a third embodiment of the invention. FIG. 14 is a time chart representing operation of the display element 30 and light source 11 after step S35 in FIG. 13. In step S35, to meet the period of the sub-frame SF when the display period ratio A is switched to the target display period ratio Ax, the drive current I and drive period H of the light source 11 may be switched. Later, in step S37a, the display period ratio A of each mirror of the display element 30 may be switched. In step S37b, the drive timing of the light source 11 may be switched in accordance with the switching of the display period ratio A.

Further, only the first temperature threshold value T1 is considered as a threshold value of the temperature T for switching the display period ratio A. Bus, as shown in FIG. 21, a second temperature threshold value T2 may be provided to give a hysteresis control characteristic. By giving a hysteresis control characteristic, it is possible to reduce a fluctuation in the display period ratio A due to a fluctuation in the temperature data T near the threshold value.

INDUSTRIAL APPLICABILITY

The present invention relates to a display device for vehicle, and is applicable as a display device for displaying vehicle information, which is installed in a movable body such as an automobile, projects a display image on a windshield of a vehicle, and displays a virtual image.

DESCRIPTION OF REFERENCE NUMERALS

1 Display device for vehicle
2 Windshield
3 Vehicle driver
10 Illumination device
11 Light source
11r Red LED
11g Green LED
11b Blue LED
12 Circuit board
13 Reflection/transmission optical means
13a Reflection mirror
13b Dichroic mirror
13c Dichroic mirror
14 Uneven brightness reduction optical means
20 Illumination optics
30 Display element (Spatial light modulation element)
40 Temperature detection means
41 Temperature sensor
42 A/D converter
50 Projection optics
60 Screen
70 Plane mirror
71 Concave mirror
80 Housing
81 Window part
90 Control unit
91 Illumination control unit (Light source control unit)
92 Display control unit (Light modulation element control unit)
300 Display image signal
310 Illumination control data
320 Display control data
A Display period ratio
Ao Display period ratio before switching
Ax Target display period ratio
B Blue illumination light
C Illumination light
E Mirror (Pixel)
Ea Single color mirror
Eb Mixed color mirror
Ec Turn off mirror
F Frame (Frame period)
Fa Display period
Fap ON drive ratio in a display period
Faq OFF drive ratio in a display period
Fb Non-display period
Fbp ON drive ratio in a non-display period
Fbq OFF drive ratio in a non-display period
G Green illumination light
L Display light
M Display image
P ON drive ratio in a frame
R Red illumination light
SF Sub-frame
T Temperature
T1 First temperature threshold value
T2 Second temperature threshold value
V Virtual image

The invention claimed is:

1. A display device for vehicle comprising:
a light source configured to be able to emit light of a plurality of colors;
a light source controller connected to a first input configured to receive illumination control data based on a display image signal, connected to the light source, and configured to perform field sequential color control of the light source based on the control data;
a digital micro-mirror device which is provided with a plurality of pixels for performing at least ON drive for spatial modulation of light from the light source in a predetermined direction, and OFF drive other than the ON drive, and is configured to generate a display image for each frame period in the predetermined direction based on the display image signal; and
a light modulation element controller connected to a second input configured to receive display control data based on the display image signal, connected to the digital micro-mirror device, and configured to perform the ON drive or OFF drive of each of the pixels of the digital micro-mirror device based on the display image signal;
a temperature sensor configured to measure a temperature of or around the digital micro-mirror device, wherein
the frame period includes:
a display period in which the light source controller turns on the light source based on the display image signal, and the light modulation element controller generates the display image in the digital micro-mirror device, and
a non-display period in which the light source controller turns off all the light sources, and
the light modulation element controller performs the ON drive or OFF drive of each pixel so that an ON drive ratio and an OFF drive ratio within the frame becomes substantially equal; and
the light modulation element controller simultaneously changes a drive current value and a drive period of the light source, when the light modulation element controller changes changing a display period ratio that is a ratio of the display period in the frame period based on the temperature, and
wherein the light modulation element controller simultaneously changes the drive current value and the drive period when changing the display period ratio, so that display brightness of the display image is not changed before and after switching the display period ratio.

2. The display device for vehicle according to claim 1, wherein the light modulation element controller drives the digital micro-mirror device in the non-display period, so that an OFF drive period of each of the pixels in the frame period becomes longer than an ON drive period.

* * * * *